(12) United States Patent
Turner et al.

(10) Patent No.: US 7,552,262 B1
(45) Date of Patent: Jun. 23, 2009

(54) INTEGRATION OF AN OPERATIVE STANDALONE ROUTER INTO A MULTI-CHASSIS ROUTER

(75) Inventors: Steve W. Turner, Menlo Park, CA (US); Sriram Raghunathan, Cupertino, CA (US); Jeffrey M. DiNapoli, San Francisco, CA (US); Umesh Krishnaswamy, San Jose, CA (US); Anurag P. Gupta, Saratoga, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 199 days.

(21) Appl. No.: 11/217,017

(22) Filed: Aug. 31, 2005

(51) Int. Cl.
G06F 15/173 (2006.01)
H05K 7/10 (2006.01)
(52) U.S. Cl. .............. 710/302; 710/301; 710/316; 710/317; 709/238; 370/351
(58) Field of Classification Search ......... 710/301–302, 710/316–317; 370/351–357; 709/238–244
See application file for complete search history.

(56) References Cited

U.S. PATENT DOCUMENTS

| | | | | |
|---|---|---|---|---|
| 5,454,080 A * | 9/1995 | Fasig et al. .................. 710/302 |
| 5,684,984 A | 11/1997 | Jones et al. |
| 5,848,227 A | 12/1998 | Sheu |
| 6,161,151 A * | 12/2000 | Sudhakaran et al. .......... 710/10 |
| 6,205,502 B1 * | 3/2001 | Endo et al. ................... 710/100 |
| 6,253,266 B1 * | 6/2001 | Ohanian ...................... 710/301 |
| 6,285,679 B1 * | 9/2001 | Dally et al. .................. 370/413 |
| 6,370,145 B1 * | 4/2002 | Dally et al. .................. 370/400 |
| 6,594,229 B1 | 7/2003 | Gregorat |
| 6,594,721 B1 * | 7/2003 | Sakarda et al. .............. 710/304 |
| 6,597,689 B1 * | 7/2003 | Chiu et al. ................... 370/354 |
| 6,618,805 B1 * | 9/2003 | Kampe ........................... 713/1 |
| 6,654,381 B2 * | 11/2003 | Dally et al. .................. 370/412 |
| 6,751,191 B1 | 6/2004 | Kanekar et al. |
| 6,816,936 B1 * | 11/2004 | Wu et al. ..................... 710/302 |
| 6,854,069 B2 * | 2/2005 | Kampe et al. .................. 714/4 |
| 6,910,148 B1 | 6/2005 | Ho et al. |
| 6,941,487 B1 | 9/2005 | Balakrishnan et al. |
| 6,948,088 B1 | 9/2005 | Sharan |
| 6,966,058 B2 * | 11/2005 | Earl et al. .................... 717/171 |
| 6,980,543 B1 * | 12/2005 | Kastenholz et al. ......... 370/352 |
| 6,981,173 B2 * | 12/2005 | Ferguson et al. ............... 714/5 |
| 7,000,153 B2 * | 2/2006 | Inagawa et al. ............... 714/44 |
| 7,010,617 B2 * | 3/2006 | Kampe et al. ............... 709/248 |

(Continued)

OTHER PUBLICATIONS

Light Reading—"Juniper's TX Waits Its Turn"—Sep. 27, 2004—2 pages.*

(Continued)

Primary Examiner—Paul R Myers
Assistant Examiner—Brian T Misiura
(74) Attorney, Agent, or Firm—Shumaker & Sieffert, P.A.

(57) ABSTRACT

A standalone router is integrated into a multi-chassis router. Integrating the standalone router into a multi-chassis router requires replacing switch cards in the standalone router with multi-chassis switch cards. The multi-chassis switch cards forward packets to a central switch card chassis for routing within the multi-chassis router. By incrementally replacing standalone switch cards with multi-chassis switch cards in the standalone router, packet forwarding performance is maintained during the integration.

25 Claims, 7 Drawing Sheets

FIG. 4

U.S. PATENT DOCUMENTS

| | | | |
|---|---|---|---|
| 7,046,683 B1* | 5/2006 | Zhao | 370/401 |
| 7,054,926 B1* | 5/2006 | Abidi et al. | 709/223 |
| 7,069,354 B2* | 6/2006 | Pooni et al. | 710/38 |
| 7,076,555 B1 | 7/2006 | Orman et al. | |
| 7,076,696 B1 | 7/2006 | Stringer | |
| 7,096,383 B2 | 8/2006 | Talaugon et al. | |
| 7,117,311 B1* | 10/2006 | Rankin et al. | 711/146 |
| 7,146,448 B2* | 12/2006 | Davies et al. | 710/302 |
| 7,151,741 B1* | 12/2006 | Elliot et al. | 370/218 |
| 7,154,902 B1* | 12/2006 | Sikdar | 370/412 |
| 7,159,017 B2* | 1/2007 | Oi et al. | 709/220 |
| 7,164,676 B1 | 1/2007 | Chakraborty | |
| 7,167,479 B2* | 1/2007 | Christensen et al. | 370/401 |
| 7,233,975 B1 | 6/2007 | Gerraty et al. | |
| 7,263,091 B1* | 8/2007 | Woo et al. | 370/351 |
| 7,274,702 B2* | 9/2007 | Toutant et al. | 370/400 |
| 7,406,038 B1* | 7/2008 | Oelke et al. | 370/225 |
| 2001/0017863 A1* | 8/2001 | McMillian et al. | 370/420 |
| 2002/0060986 A1 | 5/2002 | Fukushima et al. | |
| 2002/0103921 A1* | 8/2002 | Nair et al. | 709/232 |
| 2002/0133400 A1* | 9/2002 | Terry et al. | 705/14 |
| 2002/0191619 A1 | 12/2002 | Shafer | |
| 2002/0198974 A1 | 12/2002 | Shafer | |
| 2003/0007493 A1* | 1/2003 | Oi et al. | 370/395.31 |
| 2003/0099247 A1* | 5/2003 | Toutant et al. | 370/401 |
| 2003/0147376 A1* | 8/2003 | Coutinho et al. | 370/351 |
| 2003/0200330 A1 | 10/2003 | Oelke et al. | |
| 2003/0235195 A1 | 12/2003 | Shenoy et al. | |
| 2004/0030766 A1 | 2/2004 | Witkowski | |
| 2004/0034871 A1 | 2/2004 | Lu et al. | |
| 2004/0042395 A1 | 3/2004 | Lu et al. | |
| 2004/0062196 A1* | 4/2004 | Gunner et al. | 370/222 |
| 2004/0078621 A1 | 4/2004 | Talaugon et al. | |
| 2005/0175017 A1* | 8/2005 | Christensen et al. | 370/396 |
| 2005/0226144 A1 | 10/2005 | Okita | |
| 2005/0257213 A1 | 11/2005 | Chu et al. | |
| 2006/0039384 A1* | 2/2006 | Dontu et al. | 370/400 |
| 2006/0056285 A1 | 3/2006 | Krajewski, III et al. | |
| 2006/0101375 A1 | 5/2006 | Loughlin et al. | |
| 2006/0120342 A1* | 6/2006 | Christensen et al. | 370/351 |
| 2007/0006056 A1* | 1/2007 | Lehner et al. | 714/727 |
| 2008/0044181 A1* | 2/2008 | Sindhu | 398/49 |

OTHER PUBLICATIONS

Light Reading—"Boston See Party"—Jul. 8, 2004—2 pages.*
Cisco Systems—"Cisco CRS-1 24-Slot Fabric-Card Chassis"—retrieved May 9, 2007—6 pages.*
Avici Systems—Press Release—"Avici Demonstrates Carries Class System Scalability and Reliability of its Routing Platform"—1 page, Jun. 22, 2004.*
Avici Systems—Press Release—"Avici and Ciena Demonstrate Dynamic Bandwidth Provisioning Across Intelligent Optical Network"—1 page, Jun. 5, 2001.*
Network World: "New ways of routing the Internet". 2 pages, Jan. 19, 1998.*
The Yankee Group Report: "Core Competence: New Requirements for Core Routing". 8 pages, Apr. 2002.*
"Scalability of a class of Switch Networks", by Yue (Edward) Yao, Department of Engineering Mathimatecs, Dalhousie University. 8 pages, May 16-18, 2005.*
"TX Matrix Platform Migration Guide," Juniper Networks, Inc., Revision 3, Dec. 9, 2004, 65 pgs.
"T640 Routing Node and TX Matrix Platform: Architecture," Juniper Networks, Inc., White Paper, 2004, 21 pgs.
"Cisco Carrier Routing System," Cisco Systems, May 19, 2004, 12 pgs.
U.S. Appl. No. 11/202,982, entitled "Extending Standalone Router Syntax To Multi-Chassis Routers," filed Aug. 12, 2005.
U.S Appl. No. 11/280,887, entitled "Push-Based Hierachical State Propagation Wthin A Multi-Chassis Network Device," filed Nov. 16, 2005.
U.S. Appl. No. 11/292,204, entitled "Non-Stop Forwarding In A Multi-Chassis Router," filed Dec. 1, 2005.
U.S. Appl. No. 11/235,468, entitled "Centralized Configuration of A Multi-Chassis Router," filed Sep. 26, 2005.
U.S. Appl. No. 11/235,715, entitled "Software Installation In A Multi-Chassis Network," filed Sep. 26, 2005.
"TX Matrix™ Platform: Hardware Components and Cable System," White Paper, Juniper Networks, Inc., Mar. 15, 2005, 12 pgs.
Gary Matthews and Richard Hendricks, "Chapter Four—Routing Matrix," JUNOS 7.0 Feature Guide, Juniper Networks, Inc., Oct. 6, 2004, pp. 197-241.
Xiaozhe Zhang, "ARS: An Sychronization Algorithm Maintaining Single Image Among Nodes' Forwarding Tables of Clustered Router," Sep. 6, 2005, Springer Berlin/Heidelberg, vol. 3619/2005, pp. 752-761.

* cited by examiner

INTEGRATION OF AN OPERATIVE STANDALONE ROUTER INTO A MULTI-CHASSIS ROUTER

TECHNICAL FIELD

The invention relates to computer networks and, more particularly, to routing packets within computer networks.

BACKGROUND

A computer network is a collection of interconnected computing devices that can exchange data and share resources. In a packet-based network, such as an Ethernet network, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices, referred to as routers, maintain tables of routing information that describe routes through the network. A "route" can generally be defined as a path between two locations on the network. Upon receiving an incoming data packet, the router examines destination information within the packet to identify the destination for the packet. Based on the destination, the router forwards the packet in accordance with a routing table.

Service providers, for example an Internet service provider, must meet increasing bandwidth demands. This requires service providers to continuously add, replace or upgrade routing equipment within their networks. The relatively short deployable lifetime of routing equipment causes increased capital expenditure and investment.

SUMMARY

In general, the invention is directed to techniques for transition of an operative standalone router into a multi-chassis router with reduced interruption of packet-forwarding functions. A standalone router typically includes a plurality of interface cards to receive packets and send packets and a standalone switch fabric with a plurality of switch planes that enables packet forwarding between the plurality of interface cards of the standalone router. The techniques described herein allow the switch fabric of the standalone router to be incrementally transitioned to switch fabric capable of integration with a multi-chassis router.

In particular, standalone switch fabric of the operative standalone router is transitioned to switch fabric capable of operating as a component within a multi-stage switch fabric of a multi-chassis router. For example, the standalone router includes a set of switch cards that provide the switch planes for routing data packets. The standalone switch cards are incrementally replaced with multi-chassis switch cards that provide components of the multi-stage switch fabric. Each standalone switch card can be independently replaced and tested. Multi-chassis switch cards may be coupled to other switch cards in the multi-chassis router to form independent switch planes. Each independent switch plane may be tested without loss of forwarding functionality of the router. When the switch cards have been completely transitioned, the standalone router is then configured and rebooted to operate as a line card chassis (LCC) as part of the multi-chassis router. In this way, an operative standalone router can be smoothly integrated into a multi-chassis router in which the router functions as one of a plurality of cooperating routing components operating as a single routing node.

The techniques may provide one or more advantages. For example, the techniques allow the standalone router to continue to actively forward network packets during a transition into a component of a larger multi-chassis router, thereby increasing network availability and reducing downtime. Furthermore, the techniques also allow installed multi-stage switch fabric to be tested during the transition. For example, the packet forwarding ability of LCC switch cards to a switch card chassis may be tested using active switch card chassis (SCC) switch cards connected to only a single LCC. In the event that a test is not completed successfully, the invention provides an ability to gracefully back out of the transition into a multi-chassis router without a disruption to network traffic. These and other benefits of the invention will become apparent from the description, drawings and claims.

In one embodiment, a method comprises transitioning an operative standalone router into a component of a multi-chassis router by incrementally replacing standalone switch cards within the standalone router with multi-chassis switch cards.

In a second embodiment, a method comprises transitioning an operative standalone router into a component of a multi-chassis router while continuing to operate the standalone router in a standalone mode.

In another embodiment, a standalone router comprises an operative standalone switch fabric and an operative multi-chassis switch fabric. A multi-chassis switch plane including the operative multi-chassis switch fabric also includes a switch fabric contained in another chassis of a multi-chassis router.

In another embodiment, a system comprises a router operating in a standalone mode and coupled to a switch card chassis of a multi-chassis router. The router operates in the standalone mode to forward traffic to the switch card chassis and the switch card chassis forwards the traffic back to the router.

In one more embodiment, a router comprises a first switch fabric and a second switch fabric. The first switch fabric forms one or more standalone switch planes. The second switch fabric combines with a third switch fabric to form one or more additional switch planes. The third switch fabric is external to the router.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
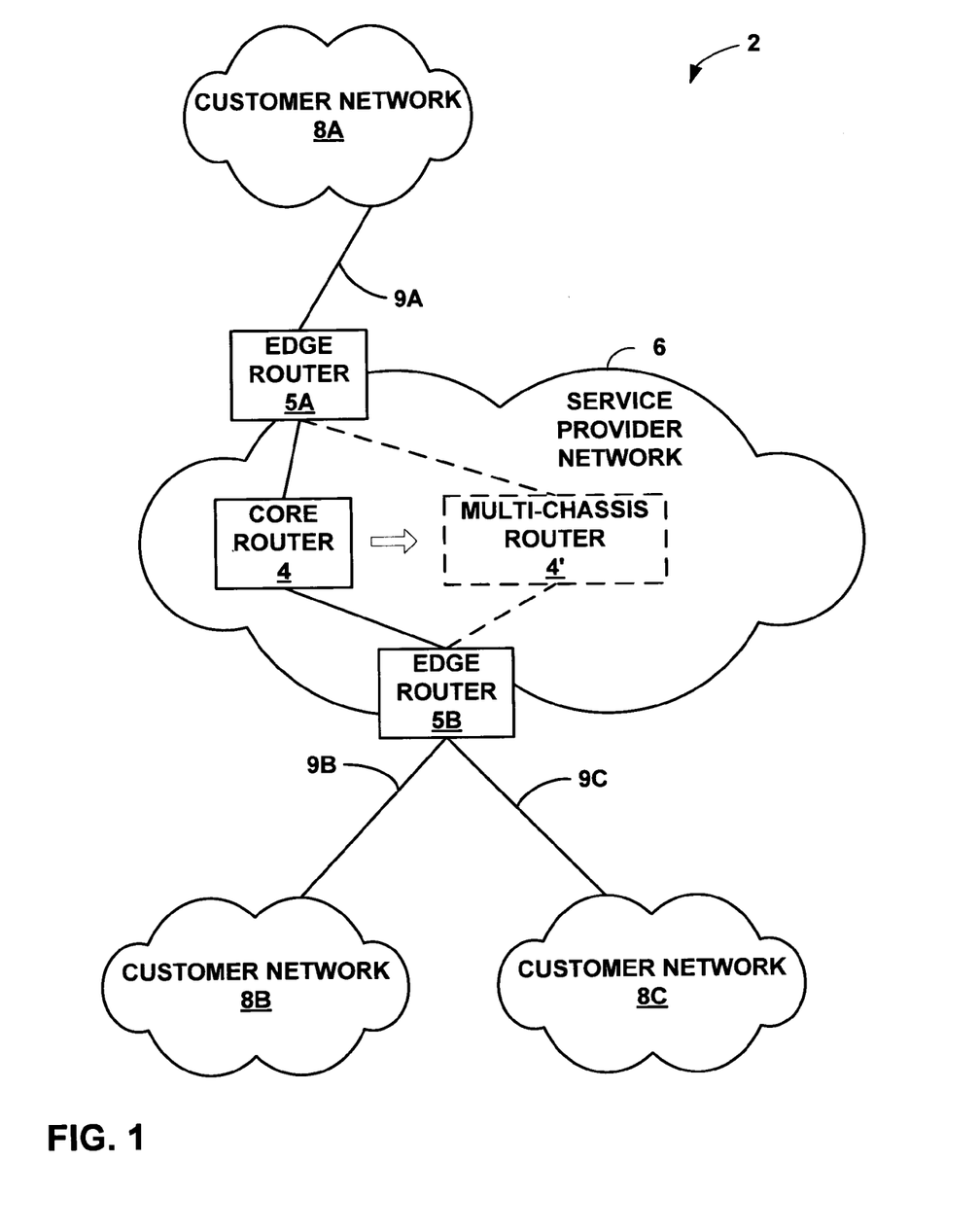
FIG. 1 is an example system comprising a service-provider network, illustrating a standalone router transitioned to a multi-chassis router in accordance with the principles of the invention.

FIG. 1 is a block diagram illustrating an example system 2 in which core router 4 of service provider network 6 is transitioned to a multi-chassis router 4' in accordance with the principles of the invention. In this example, core router 4 communicates with edge routers 5A and 5B ("edge routers 5") to provide customer networks 8A-8C ("customer networks 8") with access to service provider network 6.

Although not illustrated, service provider network 6 may be coupled to one or more networks administered by other providers, and may thus form part of a large-scale public network infrastructure, e.g., the Internet. Consequently, customer networks 8 may be viewed as edge networks of the Internet. Service provider network 6 may provide computing devices within customer networks 8 with access to the Internet, and may allow the computing devices within the customer networks to communicate with each other. Service provider network 6 may include a variety of network devices other than core router 4 and edge routers 5, such as additional routers, switches, servers, and the like.

In the illustrated embodiment, edge router 5A is coupled to customer network 8A via access link 9A and edge router 5B is coupled to customer networks 8B and 8C via access links 9B and 9C, respectively. Customer networks 8 may be networks for geographically separated sites of an enterprise. Each of customer networks 8 may include one or more computing devices (not shown), such as personal computers, laptop computers, handheld computers, workstations, servers, switches, printers, and the like. The configuration of network 2 illustrated in FIG. 1 is merely exemplary. For example, an enterprise may include any number of customer networks 8. Nonetheless, for ease of description, only customer networks 8A-8C are illustrated in FIG. 1.

In this example, core router 4 is a standalone router, which is transitioned to a multi-chassis router 4'. As part of this transition, the standalone switch fabric of core router 4 may be incrementally augmented or replaced with switch fabric that may operate in multi-chassis router 4'. During the transition, the switch fabric in the standalone router 4 is connected to the switch fabric of an SCC, which provides central control of multi-chassis router 4'. At this time, the SCC switch fabric returns data packets forwarded by the replaced switch fabric to standalone router 4. In this way standalone router 4 continues to forward data packets in service provider network 6 during the transition to multi-chassis router 4'. Once the entire switch fabric in routing node 4 has been incrementally transitioned, routing node 4 is rebooted to operate as part of multi-chassis router 4', which includes the SCC.

While the techniques of transitioning a standalone router to a multi-chassis router have been described with respect to core router 4, the techniques may be applied to upgrade any routing node. For example, edge routers 5 and/or customer networks 8 may also comprise standalone routers that may be upgraded to multi-chassis routers.

Figure 2:
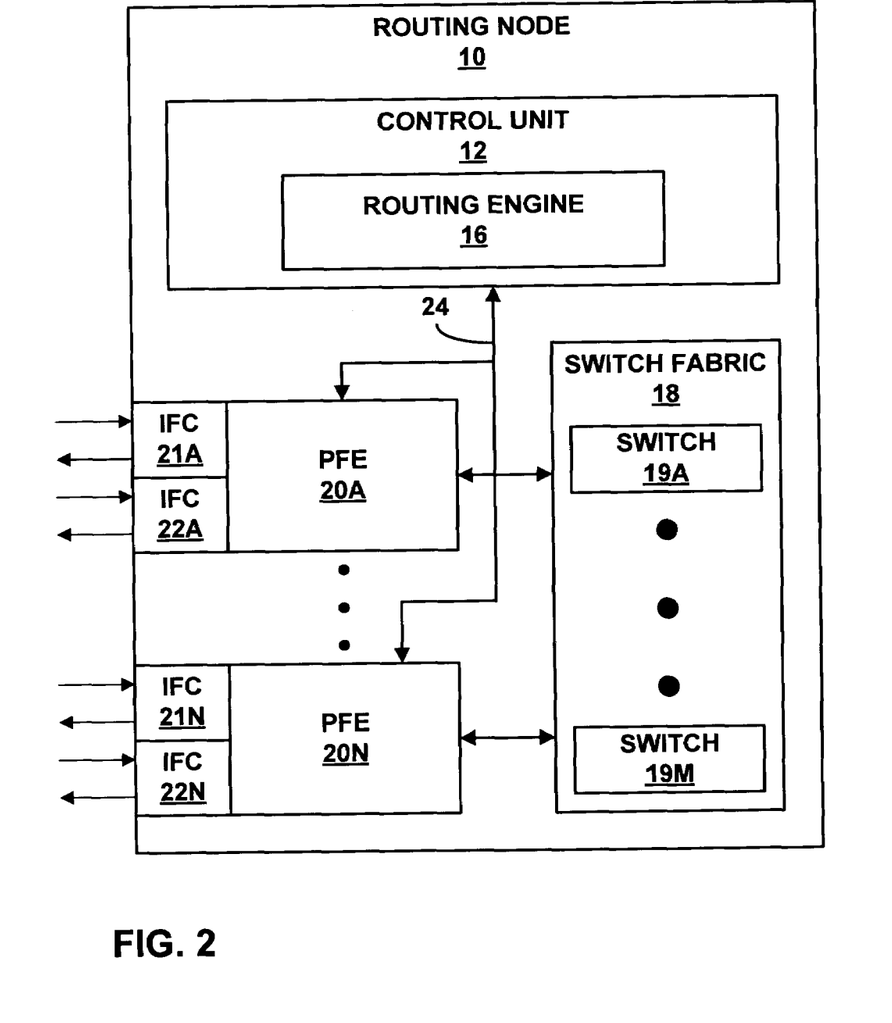
FIG. 2 is a block diagram illustrating a standalone router.

FIG. 2 is a block diagram illustrating an example standalone routing node 10 that may be transitioned to serve as a routing component within a multi-chassis router. In this example, standalone routing node 10 includes a control unit 12 that includes a routing engine 16. Standalone router 10 also includes packet forwarding engines 20A through 20N ("PFEs 20") and a switch fabric 18. PFEs 20 may receive and send data packets via interface cards 21A through 21N ("IFCs 21") and IFCs 22A through 22N ("IFCs 22"). In other embodiments, each of PFEs 20 may comprise more or fewer IFCs. Switch fabric 18 forwards incoming data packets to the correct one of PFEs 20 for transmission over a network, e.g., the Internet.

Routing engine 16 maintains routing tables, executes routing protocol and controls user access to standalone routing node 10. Routing engine 16 is connected to each of PFEs 20 by a dedicated link 24. For example, dedicated link 24 may comprise a 100 Mbps Ethernet connection. Routing engine 16 maintains routing information that describes a topology of a network, and derives a forwarding information base (FIB) in accordance with the routing information. Routing engine 16 copies the FIB to each of PFEs 20. This allows the FIB in each of PFEs 20 to be updated without degrading packet forwarding performance of standalone router 10. Alternatively, routing engine 16 may drive separate FIBs which are copied to respective PFEs 20.

In a routing node, a "switch plane" is generally capable of providing a communication path between any two PFEs 20. In this example, switch fabric 18 consists of multiple standalone switch planes 19A through 19M ("switch planes 19"). In some embodiments, each of switch planes 19 is provided by a switch fabric on a separate, removable switch card. Other routing nodes may comprise additional or fewer switch planes. A majority of the switch planes, e.g., switch planes 19A-19D, may be active at any given time with data packets distributed over the active switch planes. The inactive switch plane(s) of switch fabric 18 serves as back-up(s) such that if one or more of the active switch planes goes offline, the back-up(s) automatically activate, and the bandwidth capacity of standalone router 10 is not diminished.

As part of a standalone router, switch planes 19 form a standalone switch fabric. That is, each of switch planes 19 is capable of providing a connection between any of PFEs 20 within standalone routing node 10. Standalone routing node 10 may be transitioned to serve as part of a multi-chassis router. In that case, switch planes 19 would be incrementally replaced with switch planes spanning a multi-chassis router, which would only perform a part of the switching required to connect any two PFEs 20.

An example flow-path of data packets through standalone routing node 10 is as follows. Initially, an incoming data packet is received by one of IFCs 21 or IFCs 22, e.g., IFC 22A. The IFC is coupled to one of PFEs 20. In this example, PFE 20A segments the data packet into sixty-four-byte data cells. The data cells are written into ingress memory. PFE 20A then performs a forwarding lookup, determines a destination for the packet, and transfers the cells of the packet across the active switch planes. Each of the active switch planes forward the cells to the egress PFE. When the data cells arrive at the egress PFE, e.g., PFE 20N, they are written into egress memory and reassembled into the original packet. The data packet is then transmitted into the network (not shown) via one of IFCs 21 or 22, e.g., IFC 21N.

By dividing the data packet into cells and evenly transmitting the packet on a cell-by-cell basis across the switch planes, a PFE guarantees that traffic is load-balanced across each of the active switch planes. In standalone routing node 10, the back-up switch plane(s) may be identical to the active switch planes and act as hot spare(s) to maintain bandwidth capacity in the event that one or more of the active switch planes fail. Each of switch planes 19 is operationally independent; therefore, standalone routing node 10 may continue to forward packets as long as at least one of switch planes 19 remain active, but possibly at a reduced bandwidth capacity.

In this manner, switch planes 19 form a standalone switch fabric that enables packet forwarding between the plurality of PFEs 20 of standalone routing node 10. The techniques described herein allow switch planes 19 of the standalone router to be incrementally transitioned to switch planes capable of integration with a multi-chassis router. In particular, switch fabric 18 of the standalone routing node 10 is transitioned to a switch fabric capable of operating as a component within a multi-stage switch fabric of a multi-chassis router, e.g., multi-chassis router 4'. For example, switch fabric 18 may be provided by a set of removable switch cards, where each removable switch card provides a respective one of switch planes 19. In accordance with the principles of the invention, the switch cards are incrementally replaced with multi-chassis switch cards that provide components of the multi-stage switch fabric. Each switch card can be independently replaced, coupled to the multi-stage switch fabric of the multi-chassis router and tested without loss of forwarding functionality of the router. When the switch fabric has been completely transitioned, standalone router 10 may then be configured and rebooted to operate as an LCC in the larger multi-chassis router. In this way, an operative standalone router 10 can be integrated into a multi-chassis system in which the router functions as one of a plurality of cooperating routing components operating as a single routing node.

Figure 3:
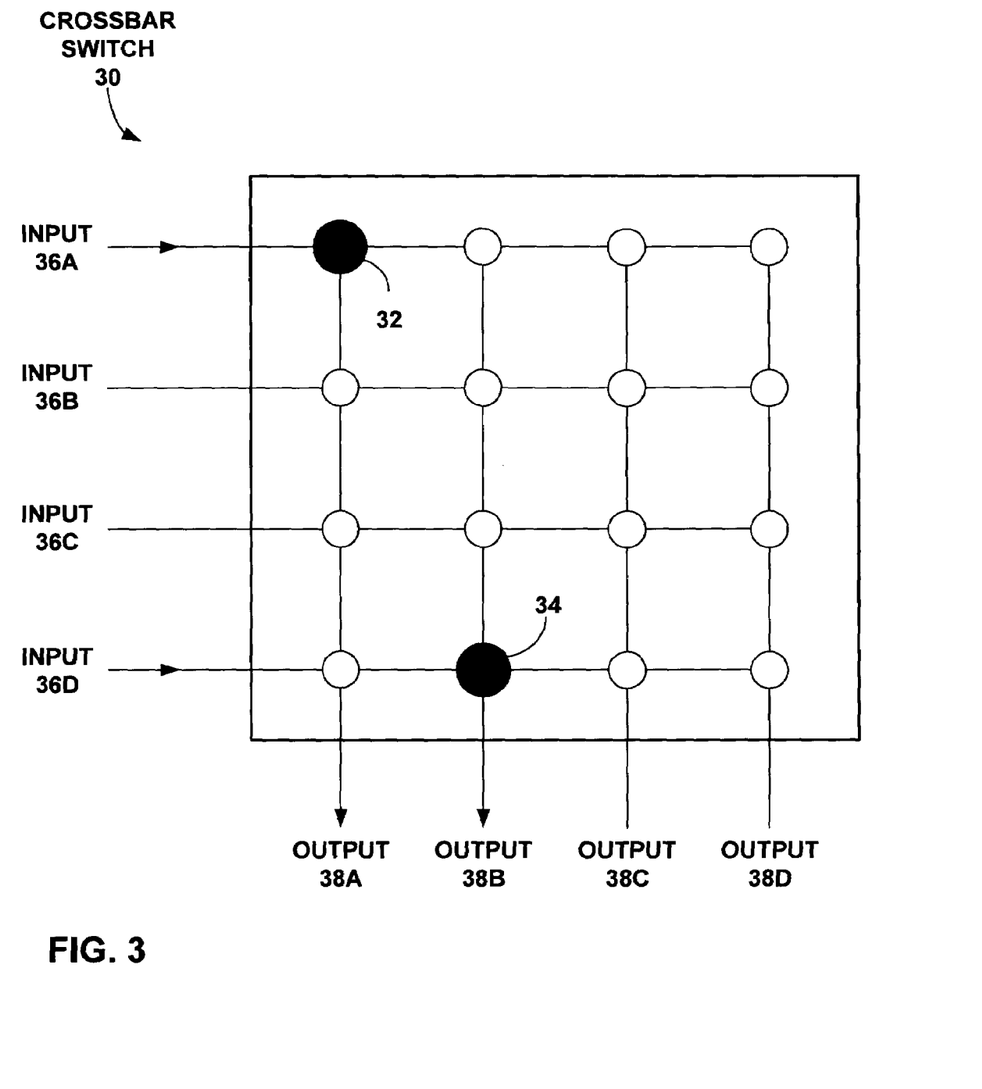
FIG. 3 is a block diagram illustrating a four-by-four crossbar switch.

FIG. 3 is a block diagram illustrating an exemplary standalone switch plane, e.g., switch planes 19 (FIG. 2), which may be transitioned to a multi-stage switch-plane capable of operating within a multi-chassis system. In particular, FIG. 3 illustrates a four-by-four crossbar switch 30. Each of inputs 36A, 36B, 36C and 36D (collectively "inputs 36") of crossbar switch 30 has a crosspoint with each of outputs 38A, 38B, 38C and 38D (collectively "outputs 38"). Crossbar switch 30 is a four-by-four crossbar switch because it contains exactly four inputs 36 and exactly four outputs 38. Other crossbar switches may contain more or less inputs and outputs. For example, each of switch planes 19 illustrated in FIG. 2 may comprise a single sixteen-by-sixteen crossbar switch.

Crossbar switch 30 comprises sixteen crosspoints, one at every point where a horizontal input path intersects a vertical output path. In crossbar switch 30, crosspoints 32 and 34 are activated, i.e., they are providing a connection between a horizontal input path and a vertical output path. Crossbar switch 30 is strictly non-blocking, in that it is always possible to establish a connecting path between any of inputs 36 any of outputs 38, regardless of existing connections across the switch. For example, active crosspoint 34 provides a direct connection for data transmission between input 36D and output 38B. Concurrently, active crosspoint 32 provides a direct connection for data transmission between input 36A and output 38A without interfering with the connection between input 36D and output 38B.

Figure 4:
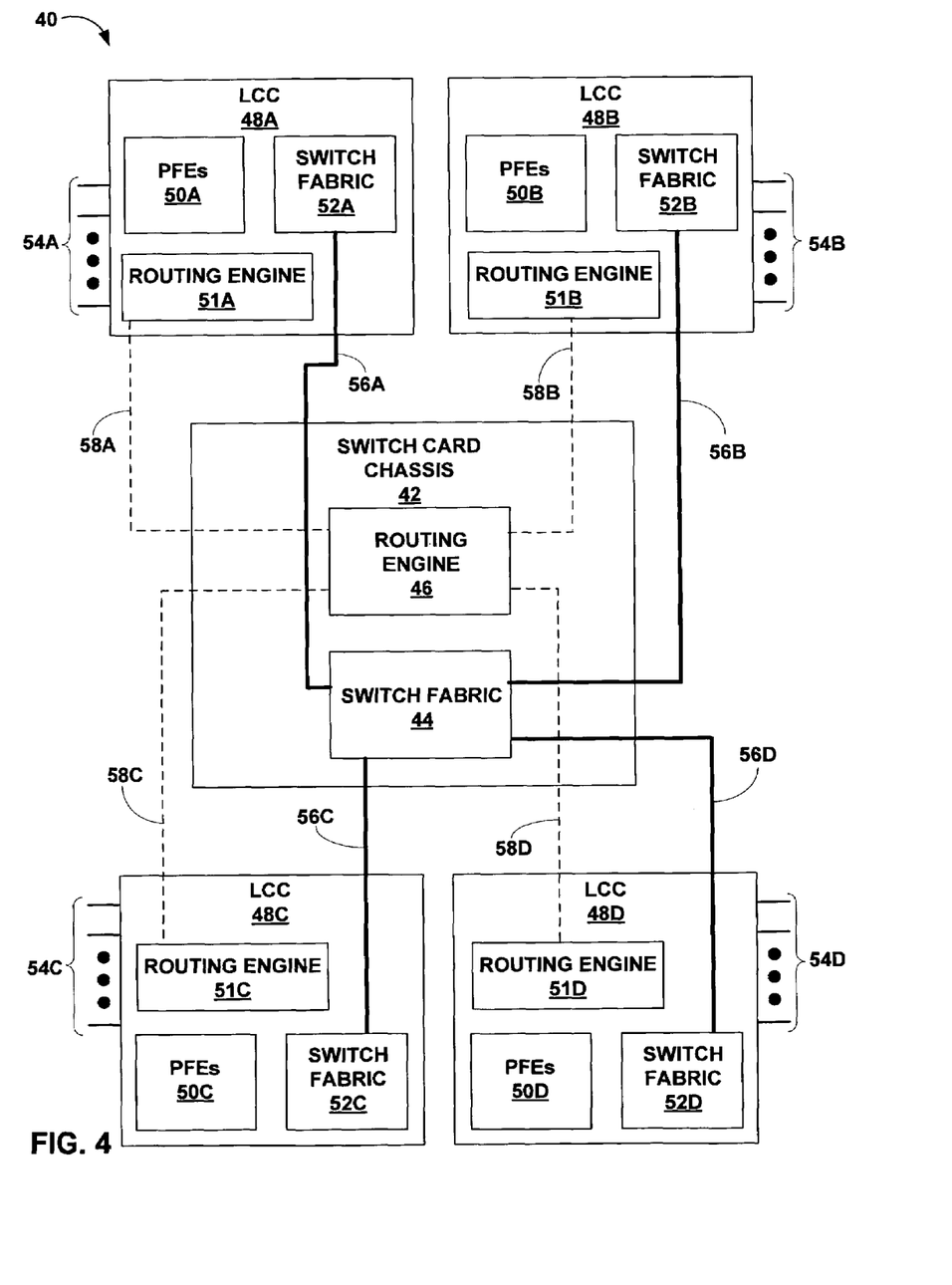
FIG. 4 is a block diagram illustrating a multi-chassis router.

FIG. 4 is a block diagram illustrating an example multi-chassis router 40. In this example, multi-chassis router 40 comprises four substantially identical LCCs 48A, 48B, 48C and 48D (collectively "LCCs 48") and an SCC 42. For examples one of LCCs 48 may have been transitioned from an operative standalone router into an LCC or may have been initially coupled to SCC 42 prior to operation. Each of LCCs 48 may be contained within a physically separate chassis and may include a routing engine 51A, 51B, 51C or 51D (collectively "routing engines 51"), switch fabric 52A, 52B, 52C or 52D (collectively "switch fabrics 52"), a PFE set 50A, 50B, 50C or 50D (collectively "PFEs 50"), and a set of network interfaces 54A, 54B, 54C or 54D (collectively "network interfaces 54"). SCC 42 comprises a centralized routing engine 46 connected to each of routing engine 51 via links 56A, 56B, 56C and 56D (collectively "links 56").

LCCs 48 are substantially similar to standalone routing node 10 (FIG. 2), except that switch fabric 18 (FIG. 2), which comprises switch planes 19, has been replaced by one of switch fabrics 52, each consisting of multiple multi-chassis switch cards. In standalone routing node 10, each of switch planes 19 contains a standalone switch plane; while in multi-chassis router 40, each switch plane may be viewed as a multi-stage switch-plane that is distributed over a multi-chassis switch card from each of LCC switch fabrics 52 and an SCC switch card from switch fabric 44.

Figure 7:
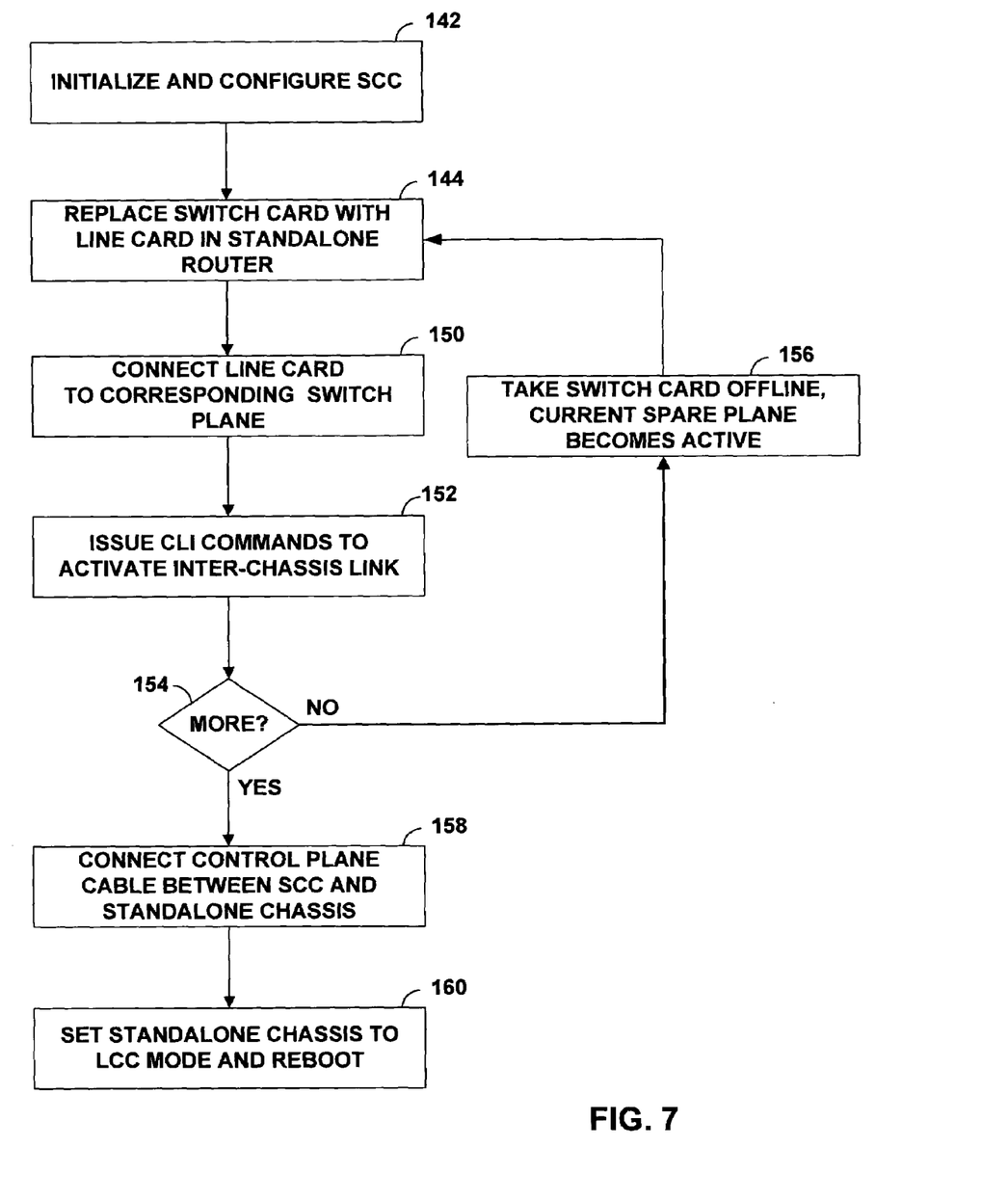
FIG. 7 is a flowchart illustrating an example method of incremental transition from a standalone-chassis node to a multi-chassis router according to an embodiment of the invention.

In other words, each multi-chassis switch card in switch fabrics 52 performs the beginning and final stages in a multi-stage network (see, e.g., FIG. 7). E.g., multi-chassis cards in switch fabrics 52 may perform the first and third stages, while switch cards in switch fabric 44 perform the second stage of a three-stage network. Together, one multi-chassis switch card from each of LCCs 48 and one SCC switch card form a switch plane. For example, SCC switch fabric 44 and LCC switch fabrics 52 may form a total of five independent switch planes. In this manner, multi-chassis router 40 may comprise five independent switch planes, each one providing a multi-stage switched interconnect for forwarding packet cells between PFEs 50. As with switch fabric 18 (FIG. 2), multi-chassis router 40 may consist of multiple active switch planes and additional redundant switch plane(s) to serve as hot spares. For example, multi-chassis router 40 may consist of four active switch planes and one redundant switch plane.

In this embodiment, each multi-chassis switch card in LCC switch fabrics 52 is connected to a single switch card in SCC switch fabric 44. A separate link connects each SCC switch card to each multi-chassis switch card. For example, links 56A may consist of five fiber-optic array cables. If multi-chassis router 40 has five switch planes, a total of twenty cables may be used to connect switch fabrics 52 with switch fabric 44.

Each PFE set 50 can include multiple PFEs. For example each PFE set 50 may include eight PFEs. Each PFE in PFE sets 50 may connect to one or more network interfaces. For example, a PFE may send and receive information packets for two network interfaces, e.g., IFCs 21A and 22A from FIG. 2. An LCC 48 containing sixteen PFEs with two network interfaces per PFE would have a total of thirty-two network interfaces. Because multi-chassis router 40 comprises four LCCs, in this example, multi-chassis router 40 would have a total of one-hundred-twenty-eight network interfaces.

Routing engine 46 maintains routing information that describes a topology of a network, and derives a FIB in accordance with the routing information.

Routing engine 46 copies the FIB to each routing engines 51 via links 58A, 58B, 58C and 58D (collectively "links 58"). For example, links 58 may comprise Unshielded Twisted Pair (UTP) Category 5 Ethernet cables, each less than one-hundred meters in length. Routing engines 51 then copy the FIB to PFEs 20 on their chassis. An ingress PFE (any of PFEs 50) uses the FIB to direct packets arriving from the network (not shown) to the proper egress PFE (also any PFE from PFEs 50). The egress PFE relays the packets to the network. The FIB in each of PFEs 50 may be updated without degrading packet forwarding performance of multi-chassis router 40 because FIB updates are distributed separately from the data packets, which use links 56. Alternatively, routing engine 46 may derive separate FIBs which are copied to respective PFEs 20.

Each of PFEs 50 is connected to all five switch planes of switch fabrics 52 and 44. Each active switch plane is responsible for providing a portion of the required bandwidth of multi-chassis router 40. By dividing the data packet into cells and evenly transmitting the packet on a cell-by-cell basis over the active switch planes, PFEs 50 load-balance traffic across the active switch planes of switch fabrics 52.

The flow path of a data packet through multi-chassis router 40 is similar to the flow path through standalone routing node 10 of FIG. 2. An incoming data packet is received by a network interface (not shown) by a PFE in PFEs 50, i.e., the ingress PFE. The ingress PFE segments the data packet into sixty-four-byte data cells. The data cells are written into ingress memory, and the ingress PFE performs a FIB lookup. Using an active route from the FIB provided by routing engine 46, the ingress one of PFEs 50 transfers the to an egress PFE using switch fabrics 52 and switch fabric 44. When the data cells arrive at an egress one of PFEs 50, they are written into egress memory and reassembled into the original packet. The reassembled packet is then transmitted via the corresponding one of network interfaces 54.

The techniques described herein allow switch planes 19 of standalone routing node 10 (FIG. 2) to be incrementally transitioned to switch planes of switch fabrics 52 capable of integration with multi-chassis router 40. In accordance with the principles of the invention, switch cards of standalone router 10 are incrementally replaced with multi-chassis switch cards that provide switch fabrics 52. In this way, an operative standalone router 10 can be integrated into multi-chassis router 40 in which router 10 functions as one of LCCs 48. The configuration shown in multi-chassis router 40 is merely exemplary. For example, PFEs 50 may communicate directly with SCC routing engine 46, rather than communicating via LCC routing engines 51. In this manner, a routing engine in a standalone router may be turned off once the standalone router is transitioned to an LCC as part of multi-chassis router 40. Other embodiments may not require SCC or any other centralized switching or control. For example, standalone switch cards in a standalone router may be transitioned with switch cards capable of switching directly between one or more routing devices, without having to use a central switch fabric. These and other numerous router configurations are included in embodiments of the invention.

Figure 5:
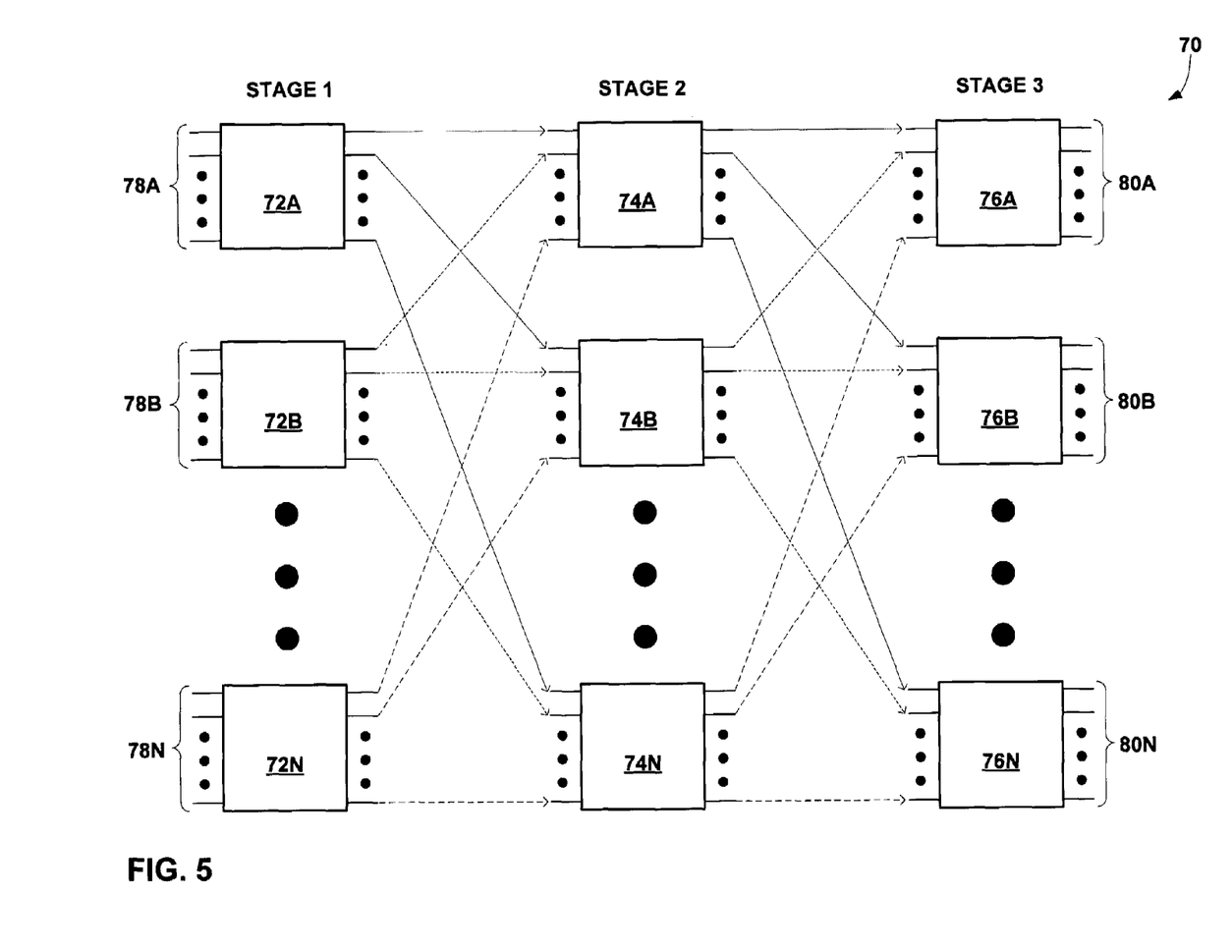
FIG. 5 is a block diagram illustrating a multi-stage network.

FIG. 5 is a block diagram illustrating a three-stage network 70 that operates as a three-stage switch plane. For example, a switch plane including an LCC multi-chassis switch card from each of LCCs 48 and an SCC switch card from SCC 42 in multi-chassis router 40 of FIG. 4 may be used to form three-stage network 70. For example, multi-chassis router 40 (FIG. 4) may comprise five switch planes, each comprising a single three-stage network. Network 70 has three stages: stage 1 consisting of crossbar switches 72A-72N (collectively "switches 72"), stage 2 consisting of crossbar switches 74A-74N (collectively "switches 74"), and stage 3 consisting of crossbar switches 76A-76N (collectively "switches 76"). Switches 72 receive data packets via inputs 78A-78N (collectively "inputs 78"). Switches 76 relay the data packets via outputs 80A-80N (collectively "outputs 80").

Assume there are sixteen inputs and sixteen outputs on each of switches 72, 74 and 76. Also for example, let N equal four. Then each stage consists of exactly four sixteen by sixteen crossbar switches, which are larger versions of crossbar switch 30 in FIG. 3. Because each of switches 72 has sixteen inputs, there are a total of sixty-four inputs in network 70. Similarly, each of switches 76 in stage 3 has sixteen outputs for a total of sixty-four outputs.

For example, maintain the assumption that there are sixteen inputs and sixteen outputs on each of switches 72, 74 and 76 and that N equals four. The outputs of switches 72 are connected to the inputs of switches 74. Each of switches 72 has four outputs connected to four inputs on each of switches 74. Likewise, each of switches 74 has four outputs connected to four inputs of each of switches 76. These redundant connections between each crossbar switch create additional paths through network 70 which may be required to make network 70 strictly non-blocking.

To establish a path through network 70, from an input to an output, an ingress PFE, e.g., PFE 50A (FIG. 4) determines an available first-stage switch 72 that allows a connection to the egress PFE. For example, the ingress PFE may select switch 72A. Switch 72A then determines an available second stage switch which allows a connection to the egress PFE. For example, switch 72A may select switch 74B. Switch 74B then determines an available third-stage switch which allows a connection to the egress PFE. For example, switch 74B may select switch 76A. Switch 76A then determines an available path to the egress PFE. Each switch determines an available path for the packet on-the-fly. In this manner, a data packet received by a switch 72 in stage 1 may go through any of switches 74 in stage 2 and continue on to the required switch 76 in stage 3 before being forwarded by an egress PFE (not shown) across a network.

While the switch planes in multi-chassis router 40 (FIG. 4) are described as containing three-stage networks, the switch planes may contain different switch architecture. For example, the second stage in a three-stage network may be replaced with a three-stage network, thereby forming a five-stage network. In accordance with the described techniques, any of the switch plane components may be independently transitioned and tested without substantially compromising forwarding functionality.

Figure 6:
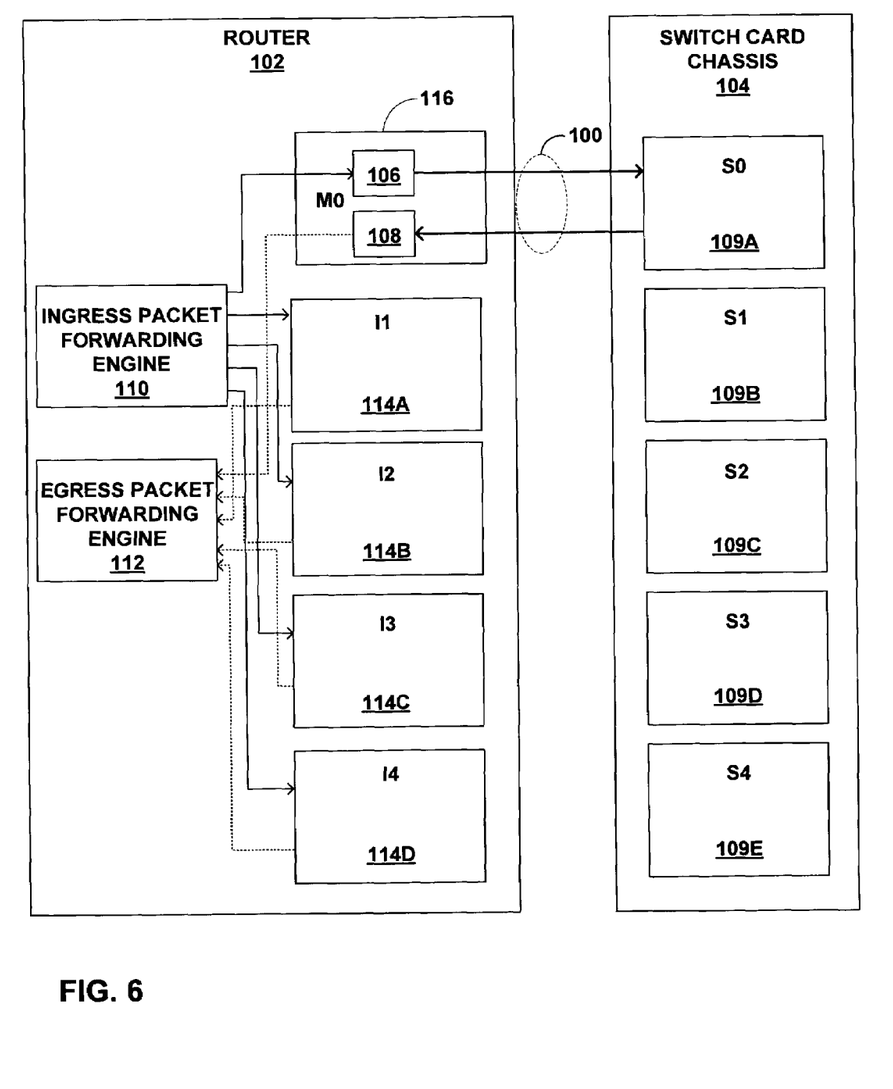
FIG. 6 is a block diagram illustrating flow-paths of data packets during incremental transition from a standalone-chassis node to a multi-chassis router according to an embodiment of the invention.

FIG. 6 is a block diagram illustrating an example standalone router 102 during incremental transition of standalone switch fabric in a standalone router to multi-stage switch fabric for a multi-chassis router according to an embodiment of the invention. In particular, FIG. 6 illustrates switch plane path 100 after a first switch plane has been transitioned from a standalone switch fabric 10 (not shown) to a multi-stage switch fabric M0 provided by multi-chassis switch card 116. As described, during the transition process, switch plane path 100 may be viewed as a hybrid of flow through standalone router 10 of FIG. 2 and the flow path through the multi-chassis router 40 of FIG. 4.

Standalone router 102 may be the same as standalone routing node 10 in FIG. 2 and SCC 104 may be the same as SCC 42 in FIG. 4. Standalone router 102 includes a network interface (not shown), ingress PFE 110, switch planes 114A, 114B, 114C and 114D (collectively "switch planes 114"), a multi-chassis switch card 116, and egress PFE 112. SCC 104 includes switch cards 109A, 109B, 109C, 109D and 109E (collectively "switch cards 109"). While switch plane path 100 only depicts a single ingress PFE 110 and a single egress PFE 112, standalone router 102 comprises additional PFEs (not shown). Each PFE in standalone router 102 acts both as an ingress PFE and an egress PFE. In switch plane path 100 the distinction is made between ingress PFE 100 and egress PFE 112 is made for illustrative purpose only.

Each of standalone switch planes 114 may comprise identical architecture, and may be embodied on a respective switch card. In contrast, multi-chassis switch card 116 contains a first-stage switch 106 and a third-stage switch 108 as part of a three-stage switch fabric. Switch card 109A contains the second-stage of a three-stage switch fabric. For example, the three-stage switch fabric may comprise a three-stage network 70 (FIG. 5).

In this example, multi-chassis switch card 116 has been inserted in router 102 and connected to switch card 109A via a single cable. While FIG. 6 shows just one standalone router 102, which is in the process of being converted to an LCC, the second-stage switches on switch cards 109 may provide a connection between multiple, operative LCCs. For example, SCC 104 may be capable of connecting four LCCs, as in SCC 42 (FIG. 4).

In the example of FIG. 6, there are five available switch plane paths. During the incremental transition stage shown in FIG. 6, the first four switch plane paths are provided by standalone switch planes 114. The fifth switch plane path is provided by multi-chassis switch card 116 and switch card 109A. Four of the five available paths are active and the fifth acts as a hot spare to maintain bandwidth capacity in the event that one of the other switch plane paths fails.

Assume for example, an incoming data packet is received by a network interface (not shown) of standalone router 102, and that the network interface is coupled to ingress PFE 110. PFE 110 segments the data packet into sixty-four-byte data cells. PFE 110 writes the data cells into ingress memory, performs a FIB lookup) and distributes the cells across the four active switch plane paths.

Assume, for example, multi-chassis switch card 116 has been activated and that switch plane 114A has been rendered inactive, i.e., designated as the current spare. Switch planes 114B, 114C and 114D form three of the four active switch planes and direct incoming cells directly to egress PFE 112. The fourth active switch plane is formed by multi-chassis switch card 116 and SCC switch card 109A. The data cells traveling to multi-chassis switch card 116 are sent to multi-chassis switch card 116 and first-stage switch 106, which forward the cells to switch card 109A in SCC 104. Switch card 109A directs the cells to return to multi-chassis switch card 116 according to switch plane path 100. Then, third-stage switch 108 directs the cells to egress PFE 112. When the data cells arrive at PFE 112 from switch planes 114B, 114C, 114D and multi-chassis switch card 116 they are written into egress memory and reassembled into the original packet. The data packet is then transmitted via a network interface (not shown) coupled to egress PFE 112.

In this manner, the techniques can be used to incrementally transition an operative standalone router, for example standalone routing node 10 of FIG. 2, into a multi-chassis router, for example multi-chassis router 40 of FIG. 4. As described, FIG. 6 illustrates a stage in the transition an administrator has replaced a single switch plane, i.e., I0, with a multi-chassis switch card, i.e., multi-chassis switch card 116, M0. During the future stages of incremental transition, as described in the description of FIG. 7, the administrator replaces each of switch planes 114 with a multi-chassis switch card, connects each multi-chassis switch card to SCC switch cards S1-S4 to form multi-stage switch planes and tests the operation of the multi-chassis switch cards and multi-stage switch planes without loss of forwarding capabilities. For example, in the next step of the incremental transition, the administrator may replace switch plane 114A, I1, with a new multi, chassis switch card, M1 (not shown). The administrator then connects M1 to SCC switch card 109B, S1, to form a new switch plane. That multi-stage switch plane will replace the packet forwarding capabilities of standalone switch plane 114A, I1. The incremental transition continues until the administrator replaces each of switch planes 114, i.e., I0, I1, I2, I3 and I4 with multi-chassis switch cards M0, M1, M2, M3 and M4 and connects them to switch cards 119, i.e., S0, S1, S2, S3 and S4.

A method of incremental transition according to an embodiment of the invention is described in greater detail in the description of FIG. 7.

Data cells that travel along path 100 may take longer to arrive at egress PFE 112 than the cells that travel along the other switch plane paths. Therefore, egress PFE 112 may buffer data cells from the other paths in memory long enough to receive the cells traveling over switch plane path 100. Egress PFE 112, and all PFEs, which each act as egress PFEs, may have additional egress memory to buffer the cells.

However, alternative techniques may be used to allow the egress PFEs to use less egress memory. For example, standalone switch cards 114 can be designed or programmed to have a delay approximately equal to the delay caused by the longer path 100. An added delay would be insignificant relative to the time it takes packets to travel from a source device over a network, e.g., the Internet, to a destination device. If either programmed or part of the physical design of switch cards 114, the delay results in all data cells of a data packet arriving at egress PFE 112 at approximately the same time. A delay can be added in any place along data cell paths including standalone switch cards 114. For example, the delay may be an extended physical path, e.g., a coiled wire, between PFEs and switch cards 114 within router 102. For example, in the case of an extended physical path, implementing the delay could be as simple as flipping a switch to connect an extended path.

The delay for cells traveling via path 100 relative to cells traveling via standalone switch cards 114 is dependent on the time it take for data cells to travels path 100. E.g. if the connection between multi-chassis switch card 116 and switch card 109A required one or more cables, the length of the cables would affect the delay. A programmable or physical delay added to data cell paths through standalone switch planes 114 can be adjustable to account for an actual or calculated delay over path 100. The delay could be instituted during a scheduled service outage prior to an incremental transition of switch cards in router 102. It is also possible for data cell paths including standalone switch cards 114 to always include a delay in anticipation of an incremental transition. However implemented, including a delay to data cell paths through standalone switch planes 114 could reduce PFE resources, in particular egress memory, required during an incremental transition.

In the illustrated example of FIG. 6, multi-chassis switch card 116, M0, combines with SCC switch card 109A, S0, to form a switch plane. In other embodiments SCC switch card 109A may comprise the entire switch plane. For example, SCC switch cards 109 may each comprise a sixty-four-by-sixty-four crossbar switch. In other embodiments, SCC switch cards 109 may perform every stage in a network. In such embodiments, the multi-chassis switch cards, e.g., multi-chassis switch card 116, M0, simply provide a constant path between an SCC switch plane, e.g., SCC switch card 109A, and every PFE in router 102.

FIG. 7 is a flowchart illustrating a method of incremental transition from a standalone router to an LCC as part of a multi-chassis router according to an embodiment of the invention. For exemplary purposes, the method is described with reference to FIG. 6.

Initially, an administrator initializes and configures SCC 104 as a central control node for a multi-chassis router (142). For example, the administrator configures SCC 104 with five switch cards 109. For reference, these switch cards are labeled S0, S1, S2, S3 and S4. Setting up SCC 104 with switch cards 109 may include assembling SCC 104, powering on SCC 104, connecting SCC 104 to a management network, installing software on SCC 104, performing diagnostics on the switch fabric, i.e., switch cards 109, of SCC 104 and setting control board switches to receive multi-chassis switch card connections. If the administrator performs diagnostics on the switch fabric of SCC 104, this may include testing for one or more ports by offlining a port, inserting a loopback connector and onlining the port.

Next the administrator replaces switch plane 10 with multi-chassis switch card 116 on standalone router 102 (144). In this step, the administrator takes offline the standby switch card, e.g., I0, in standalone router 102 and physically replaces the switch card with multi-chassis switch card 116.

Following the replacement of I0 with M0, the administrator connects multi-chassis switch card 116, M0, with SCC switch card 109A, S0 (150). For example, multi-chassis switch card 116 may be connected to a port on SCC 104 with a dedicated fiber-optic array cable less than one-hundred meters in length.

The administrator then issues software commands, first at standalone router 102, then at SCC 104, to start inter-chassis links between M0 and S0 (152). The software command at standalone router 102 may be entered at a command line interface (CLI) to turn on the receive end at standalone router 102. Likewise, the software command at SCC 104 may be entered at a CLI to turn on the receive end at SCC 104.

Next, the administrator repeats the process of steps 155, 156, 144, 150 and 154 for each switch card still to be replaced with a multi-chassis switch card without interruption of forwarding capabilities (154). For example, to begin the next iteration, the administrator takes switch plane 114A, I1, on standalone router 102 offline (156). As a result, the spare switch plane, in this case the combination of M0 and S0, automatically becomes active.

At this time, network traffic from standalone router 102 to SCC 104 is returned to the standalone router as illustrated in FIG. 6. Moreover, standalone router 102 continues to operate as a standalone router even though traffic flows through SCC 104. While traffic flows in this manner, the administrator is able to confirm correct operation of both M0 of router 102 and S0 of SCC 104. For example, verification may be performed by seeing illuminated light emitting diodes (LEDs) corresponding to the multi-chassis switch card inserted in step 144 and the SCC switch card connected in step 150. In the event that verification of a multi-chassis switch plane fails, e.g., the combination of M0 and S0, the method of incremental transition may be aborted without any interruption in traffic across router 102. To abort incremental transition 140, the multi-chassis switch card inserted in step 144, e.g., M0, may be replaced with the original switch card removed in step 144, e.g., I0.

Steps 144, 150, 152 and 156 are repeated until each of the five switch planes 114 I0, I1, I2, I3 and I4 in standalone router 102 have been replaced with multi-chassis switch cards M0, M1, M2, M3 and M4 and connected to SCC switch cards 109: S0, S1, S2, S3 and S4 (154). At this point in the incremental transition, standalone router 102 is physically ready for incorporation within a multi-chassis router, but is still operating as a standalone router.

Once the administrator is finished replacing each of switch planes 114 (154), the administrator physically connects the routing engine (not shown) of SCC 104 to standalone router 102 (158). For example, the routing engine of SCC 104 may be connected to standalone router 102 via a category-5 Ethernet cable.

The administrator completes the incremental transition by issuing one or more commands to set standalone router 102 to operate in "LCC mode". This may require rebooting the router (160). Once set to operate in LCC mode, what was formerly standalone router 102 is now an LCC integrated with SCC 104 as part of a multi-chassis router. As incremental transition is performed, standalone router 102 continues to forward traffic until it is rebooted in step 160. When rebooting standalone router 102, routing service will be interrupted at the routing node. Thus, this short period is the only time during the incremental transition that routing service is degraded or interrupted. Once standalone router 102 has been set to operate in LCC mode, operation of the system, including routing engines, switching planes and interfaces can be verified with CLI commands at the SCC. Standalone router 102, now functioning as an LCC, and SCC 104 are elements in a multi-chassis router and operate as a single routing node.

A number of embodiments of the present invention have been described. Nevertheless, it will be understood that various modifications may be made without departing from the spirit and scope of the invention. As one example, described techniques may be performed remotely. For example, a remote administrate device may provide software for a standalone router to operate an LCC. Furthermore, a remote device may be used to provide the FIB to each device a multi-chassis router. A multi-chassis router may or may not include a central switch fabric, and could using switch fabric in one or more LCCs to provide connections between the multiple devices of a multi-chassis router. Such a router may or may not include a centralized control node; e.g., LCCs may share control functions in a multi-chassis router. A standalone router may be incrementally transitioned to operate in conjunction with one or more other network devices without a centralized switch fabric or SCC. In one instance, two chassis may be coupled to operate as a single router, which each chassis including network interfaces. Accordingly, these and other embodiments are within the scope of the following claims.

The invention claimed is:

1. A method comprising:
    transitioning an operative standalone router into a first component of a multi-chassis router while continuing to operate the standalone router in a standalone mode, wherein the transitioning comprises:
        incrementally replacing standalone switch cards within the operative standalone router with multi-chassis switch cards;
        forwarding a portion of network traffic to a second component of the multi-chassis router via one or more of the multi-chassis switch cards during the incremental replacement; and
        receiving the portion of network traffic from the second component via the one or more of the multi-chassis switch cards,
    wherein the standalone router is a core router in a service provider network, wherein the portion of network traffic is a first portion of network traffic, the method further comprising:
    receiving the network traffic via the service provider network;
    forwarding the first portion of the network traffic to destination devices on the service provider network using the multi-chassis switch cards after receiving the first portion of the network traffic from the second component of the multi-chassis router; and
    forwarding a second portion of the network traffic directly to destination devices on the service provider network using the standalone switch cards.

2. The method of claim 1, wherein incrementally replacing standalone switch cards comprises:

selecting one of the standalone switch cards that is in a standby mode;

removing the selected standalone switch card from a slot of the standalone router; and using one of the multi-chassis switch cards within the slot.

3. The method of claim 2, further comprising designating one of the remaining standalone switch cards within the standalone router to operate in standby mode.

4. The method of claim 1, further comprising:

connecting the multi-chassis switch cards to a switch fabric of the second component while the standalone router is operative to form at least one independent switch plane that is distributed over the first component and the second component; and issuing a software command to activate inter-chassis links between the multi-chassis switch cards and the switch fabric of the second component.

5. The method of claim 4, further comprising verifying each of the inter-chassis links is operational before proceeding to replace another standalone switch card.

6. The method of claim 4, further comprising connecting a routing engine of the second component to the standalone router.

7. The method of claim 4, wherein the first component is a first line card chassis, the method further comprising connecting the second component to a second line card chassis.

8. The method of claim 4, wherein the second component is a switch card chassis.

9. The method of claim 1, further comprising rebooting the standalone router only after all of the standalone switch cards have been replaced.

10. The method of claim 9, wherein after rebooting the standalone router, the standalone router functions as a first line card chassis of the multi-chassis router.

11. The method of claim 1, further comprising testing the multi-chassis switch cards while continuing to operate the standalone router in a standalone mode.

12. The method of claim 11, further comprising:

determining during the transition whether one or more of the multi-chassis switch cards is non-functional; and in the event that one or more of the multi-chassis switch cards is non-functional, replacing the multi-chassis switch cards with the standalone switch cards to return the standalone router to its original configuration without requiring a reboot of the standalone router.

13. The method of claim 1, further comprising configuring the multi-chassis switch cards to:

forward packets from the standalone router to the second component of the multi-chassis router, and receive the forwarded packets from the second component until the standalone router is configured to operate as the component of the multi-chassis router.

14. The method of claim 1, further comprising:

connecting a multi-chassis switch card of the standalone router to a switch fabric of the second component; and activating an inter-chassis link between the multi-chassis switch card and the switch fabric of the second component.

15. The method of claim 14, wherein the second component is a switch card chassis.

16. The method of claim 1, wherein the transitioning comprises verifying an inter-chassis link is activated.

17. The method of claim 1, further comprising directing the standalone router to operate as part of the multi-chassis router only after replacing each standalone switch card of the standalone router with a respective one of the multi-chassis switch cards and verifying the functionality of the respective multi-chassis switch card.

18. The method of claim 17, wherein directing the standalone router to operate as part of a multi-chassis router comprises rebooting the standalone router.

19. The method of claim 17, wherein directing the standalone router to operate as part of a multi-chassis router comprises issuing one or more commands to the standalone router.

20. The method of claim 17, wherein after directing the standalone router to operate as part of a multi-chassis router, the first component functions as a first line card chassis.

21. The method of claim 20, further comprising connecting the multi-chassis router to a second line card chassis to form a routing node having at least three separate chassis.

22. The method of claim 1, wherein the standalone switch cards and the multi-chassis switch cards each include at least a first stage of a multi-stage switch fabric for routing packets.

23. The method of claim 1, wherein the standalone switch cards that are replaced each include art entire switch plane of a standalone switch fabric that forwards packets between a plurality of interface cards installed within the operative standalone router, and wherein the multi-chassis switch cards that replace the standalone switch cards of the operative standalone router each include only a portion of a multi-stage switch plane that forwards packets between a plurality of interface cards within the multi-chassis router, wherein the multi-stage switch plane is distributed over multi-chassis switch cards of at least two different chassis.

24. The method of claim 1, wherein each of the standalone switch cards is operationally independent and the standalone switch cards include at least one redundant switch plane that provides a backup switch plane, and wherein transitioning an operative standalone router into the first component of the multi-chassis router comprises automatically and repeatedly activating the backup switch plane when incrementally replacing each of the standalone switch cards so that a bandwidth capacity of the standalone router is not diminished during the transition to the multi-chassis router.

25. The method of claim 1, wherein the standalone switch cards each include an entire switch plane, wherein the multi-chassis switch cards each include only a portion of a multi-chassis switch plane.

* * * * *